United States Patent
Ogasawara et al.

(10) Patent No.: US 11,983,584 B2
(45) Date of Patent: May 14, 2024

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Kazuya Ogasawara, Kanagawa (JP); Hiroyasu Kunieda, Kanagawa (JP); Hideki Kubo, Kanagawa (JP); Takeru Sasaki, Kanagawa (JP); Yoshitaka Minami, Kanagawa (JP); Masao Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/876,732

(22) Filed: Jul. 29, 2022

(65) Prior Publication Data
US 2023/0034963 A1 Feb. 2, 2023

(30) Foreign Application Priority Data
Aug. 2, 2021 (JP) ................................ 2021-126882

(51) Int. Cl.
G06K 15/02 (2006.01)
G06K 15/10 (2006.01)

(52) U.S. Cl.
CPC ..... G06K 15/1825 (2013.01); G06K 15/1822 (2013.01); G06K 15/1868 (2013.01); G06K 15/1878 (2013.01); G06K 15/1884 (2013.01); G06K 15/102 (2013.01)

(58) Field of Classification Search
CPC ........... G06K 15/1825; G06K 15/1822; G06K 15/1868; G06K 15/1878; G06K 15/1884; G06K 15/102

USPC ......................................... 358/1.2, 1.15, 1.9
See application file for complete search history.

(56) References Cited

U.S. PATENT DOCUMENTS

| | | |
|---|---|---|
| 6,292,621 B1 | 9/2001 | Tanaka et al. |
| 7,339,700 B2 | 3/2008 | Ohga et al. |
| 7,432,985 B2 | 10/2008 | Ishikawa et al. |
| 7,924,469 B2 | 4/2011 | Ono et al. |
| 7,944,588 B2 | 5/2011 | Yamada et al. |
| 8,014,599 B2 | 9/2011 | Ohga et al. |
| 8,175,155 B2 | 5/2012 | Suwa et al. |
| 8,237,991 B2 | 8/2012 | Ono et al. |
| 9,135,523 B2 | 9/2015 | Kato et al. |
| 9,189,681 B2 | 11/2015 | Kunieda et al. |

(Continued)

FOREIGN PATENT DOCUMENTS

JP 2009-093287 A 4/2009

OTHER PUBLICATIONS

Isamu Motoyoshi, et al. "Image statistics and the perception of surface qualities" Nature, 447.7141 (2007), pp. 206-209.

*Primary Examiner* — Quang N Vo
(74) *Attorney, Agent, or Firm* — Venable LLP

(57) ABSTRACT

An image processing apparatus includes a setting unit configured to set a target region, a first acquisition unit configured to acquire a plurality of texture data for applying a metal representation on an image, a second acquisition unit configured to acquire an output condition when outputting the target region, a selection unit configured to select texture data based on the output condition, and an application unit configured to apply, to the target region, the texture data selected by the selection unit.

24 Claims, 14 Drawing Sheets

(56) References Cited

U.S. PATENT DOCUMENTS

| | | |
|---|---|---|
| 9,214,027 B2 | 12/2015 | Sumi et al. |
| 9,232,109 B2 | 1/2016 | Suwa et al. |
| 9,275,270 B2 | 3/2016 | Suwa et al. |
| 9,594,534 B2 | 3/2017 | Sasaki et al. |
| 9,747,504 B2 * | 8/2017 | Ma .................. G06T 11/60 |
| 9,871,950 B2 | 1/2018 | Arai et al. |
| 10,013,395 B2 | 7/2018 | Kajiwara et al. |
| 10,275,652 B2 | 4/2019 | Yamamoto et al. |
| 10,290,135 B2 | 5/2019 | Mizoguchi et al. |
| 10,686,952 B2 | 6/2020 | Murasawa et al. |
| 10,740,641 B2 | 8/2020 | Iguchi et al. |
| 10,742,823 B2 | 8/2020 | Iguchi et al. |
| 10,796,405 B2 | 10/2020 | Kunieda et al. |
| 10,872,279 B2 | 12/2020 | Tsuchiya et al. |
| 10,944,890 B2 | 3/2021 | Tsuchiya et al. |
| 10,958,796 B2 | 3/2021 | Obayashi et al. |
| 11,017,276 B2 | 5/2021 | Mochizuki et al. |
| 11,017,277 B2 | 5/2021 | Yamagata et al. |
| 11,074,734 B2 | 7/2021 | Kunieda et al. |
| 11,089,170 B2 | 8/2021 | Kunieda et al. |
| 11,140,277 B2 | 10/2021 | Yamada et al. |
| 11,218,603 B2 | 1/2022 | Kunieda et al. |
| 11,361,487 B2 | 6/2022 | Yamada et al. |
| 11,393,145 B2 | 7/2022 | Kunieda et al. |
| 2012/0268759 A1 | 10/2012 | Ono et al. |
| 2016/0086067 A1 * | 3/2016 | Shibasaki .......... G06K 15/1878 358/1.9 |
| 2020/0279422 A1 | 9/2020 | Yamada et al. |
| 2020/0279423 A1 | 9/2020 | Yamada et al. |
| 2020/0279426 A1 | 9/2020 | Yamada et al. |
| 2020/0304682 A1 | 9/2020 | Kubo |
| 2020/0336607 A1 | 10/2020 | Kunieda |
| 2020/0336608 A1 | 10/2020 | Kunieda |
| 2020/0388062 A1 | 12/2020 | Kunieda et al. |
| 2022/0172470 A1 | 6/2022 | Ogasawara et al. |
| 2022/0172471 A1 | 6/2022 | Yamada et al. |
| 2022/0172472 A1 | 6/2022 | Yamada et al. |
| 2022/0262054 A1 | 8/2022 | Takeichi et al. |
| 2022/0262055 A1 | 8/2022 | Takeichi et al. |
| 2022/0262056 A1 | 8/2022 | Takeichi et al. |
| 2022/0262057 A1 | 8/2022 | Takeichi et al. |
| 2022/0263952 A1 | 8/2022 | Takeichi et al. |
| 2022/0263953 A1 | 8/2022 | Takeichi et al. |
| 2022/0263954 A1 | 8/2022 | Takeichi et al. |

* cited by examiner

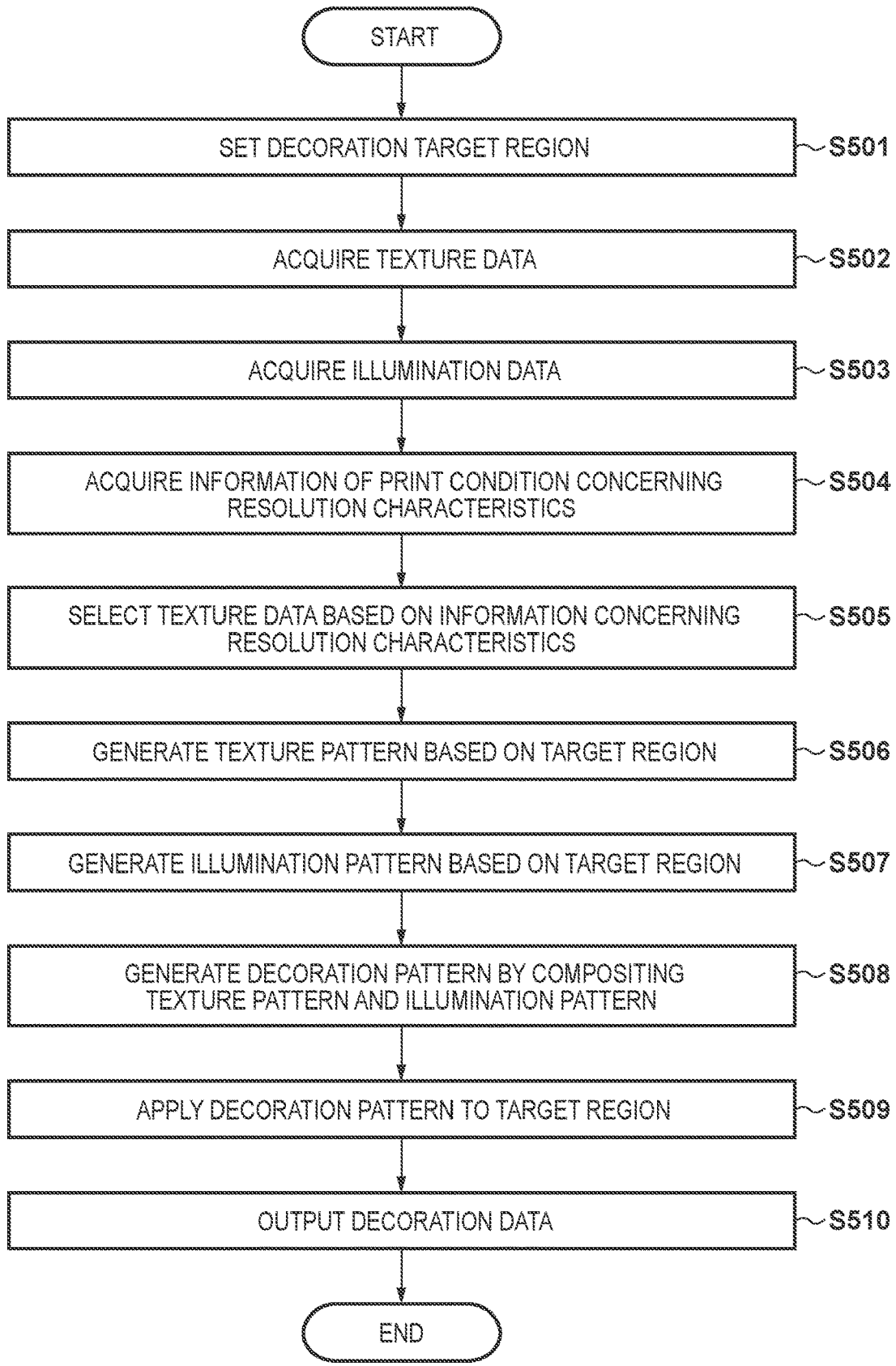

FIG. 6A
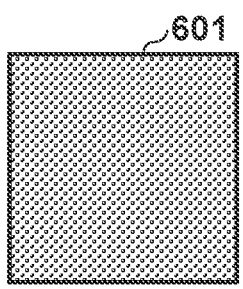
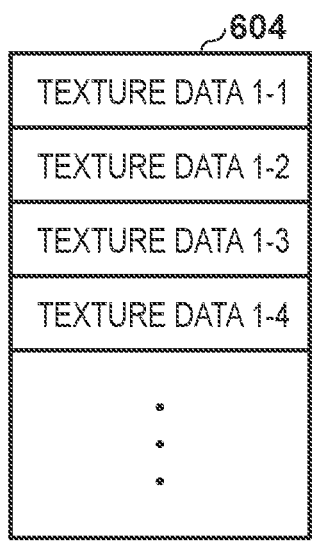
FIG. 6B
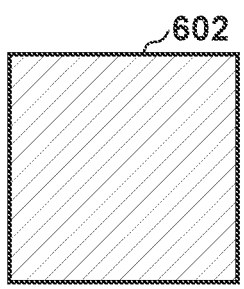
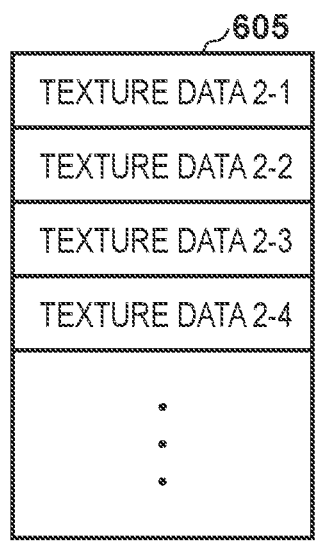
FIG. 6C
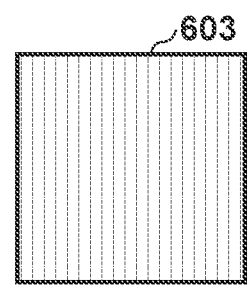
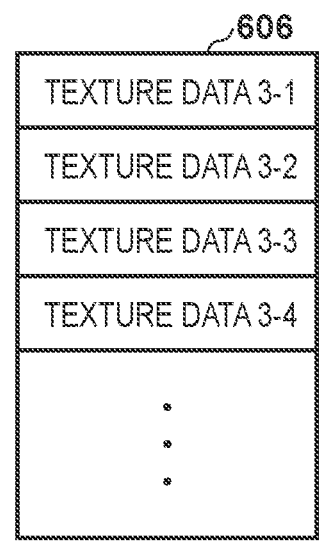

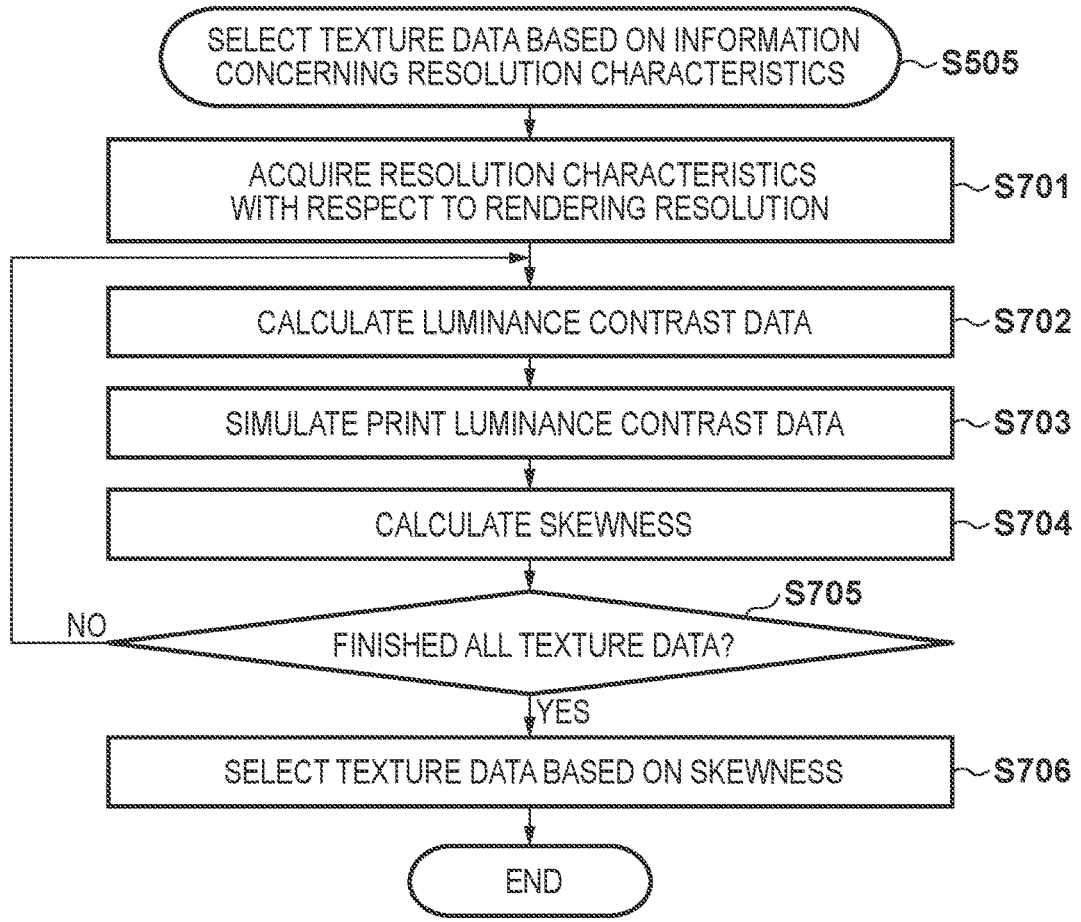
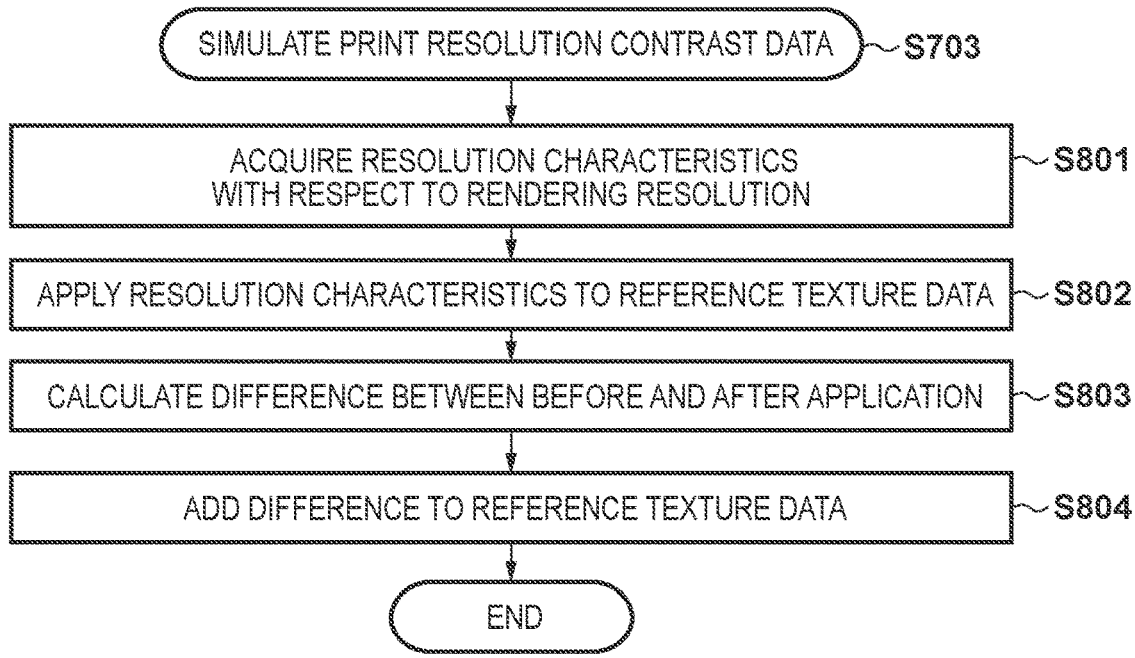

FIG. 9A
| RENDERING RESOLUTION | TEXTURE DATA |
|---|---|
| 1200dpi | A |
| 600dpi | B |
| 300dpi | C |
| 150dpi | D |
FIG. 9B
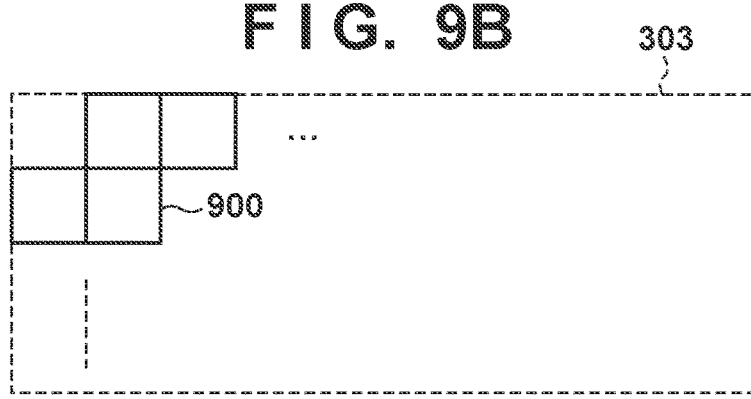
FIG. 10
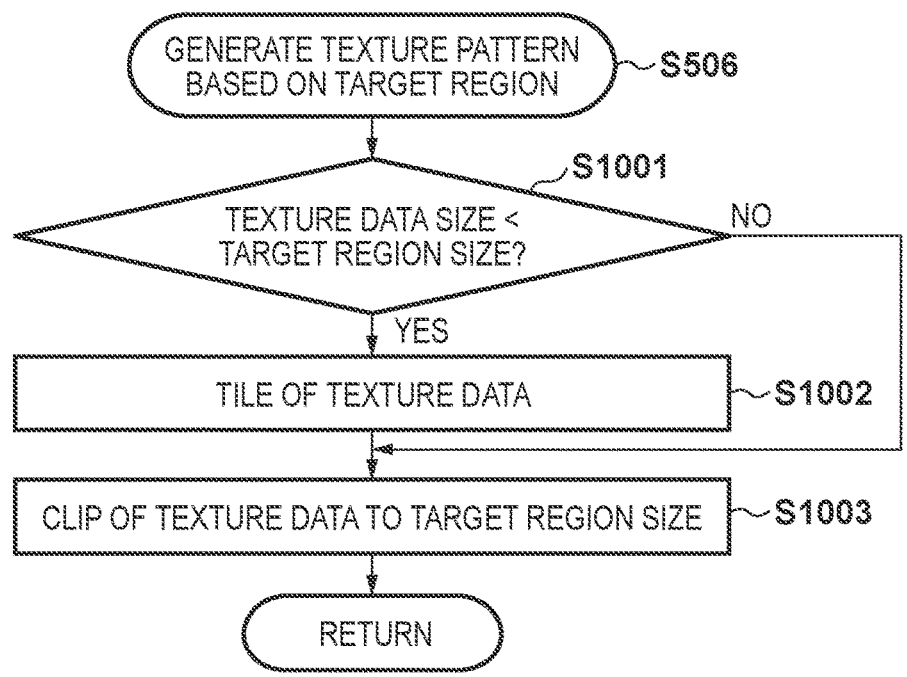

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

There is known a decoration technique of adding metal texture by adding texture data to an object to be decorated on digital data. In a decoration technique described in Japanese Patent Laid-Open No. 2009-93287, information concerning a light source in a location where data decorated by texture data is observed is acquired first. Then, data having realistic texture is generated by performing, for the texture data, correction of faithfully reproducing metal reflection caused under the acquired light source.

However, the conventional technique does not consider print characteristics when printing the decorated data. When printing digital data, the digital data is not always printed equally due to the characteristics of a printing device or a print medium such as a sheet used for printing. If, for example, an inkjet printer is used, a blurred print result of the digital data is obtained due to ink bleeding on a print medium or the like, this blur characteristics change depending on the printing device, the print medium, and the like. If different printing devices are used to execute printing, the print result of printed texture is different for each printing device, and metal texture is perceived differently. The print characteristics change depending on the print resolution, the print medium type, and the like as well as the characteristics of the printing device.

SUMMARY OF THE INVENTION

The present invention provides a technique of suppressing deterioration in decoration effect caused by an output condition in a decoration technique of reproducing a metal representation by adding texture data.

According to an aspect of the present invention, there is provided an image processing apparatus comprising: a setting unit configured to set a target region; a first acquisition unit configured to acquire a plurality of texture data for applying a metal representation on an image; a second acquisition unit configured to acquire an output condition when outputting the target region; a selection unit configured to select texture data based on the output condition; and an application unit configured to apply, to the target region, the texture data selected by the selection unit.

Further features of the present invention will become apparent from the following description of exemplary embodiments (with reference to the attached drawings).

BRIEF DESCRIPTION OF THE DRAWINGS

FIG. 5 is a flowchart for explaining the procedure of processing executed by the image processing apparatus according to the first embodiment;

FIGS. 6A to 6C are views for explaining details of a texture data acquisition method in step S502;

FIG. 7 is a flowchart for explaining processing of selecting texture data in step S505 of FIG. 5;

FIG. 8 is a flowchart for explaining processing of simulating print luminance contrast data in step S703 of FIG. 7 according to the first embodiment;

FIG. 9A is a table showing an example of a reference table for linking a rendering resolution with texture data;

FIG. 9B is a view for explaining texture pattern generation processing;

FIG. 10 is a flowchart for explaining the texture pattern generation processing in step S506 of FIG. 5;

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw-

First Embodiment

The first embodiment will describe an example of creating decoration data that reproduces metal texture (metal representation) by adding texture data to a decoration region, and observing a print product obtained by printing the decoration data by an inkjet printer. An image processing apparatus according to the embodiment sets a decoration target region, and acquires at least two or more texture data as candidates to be added to the decoration target region. Next, the image processing apparatus acquires information concerning a rendering resolution at which the decoration data is output, that is, resolution characteristics. Furthermore, the image processing apparatus selects such texture data that the skewness of an output image at the rendering resolution (to be described later) is high (a luster feeling is improved) from the plurality of acquired texture data based on the acquired information concerning the resolution characteristics, and uses it for decoration processing. Then, the image processing apparatus outputs the obtained decoration data to an output apparatus (inkjet printer). An arrangement and processing according to the first embodiment will be described below with reference to FIGS. 1A to 14.

Figure 1A:
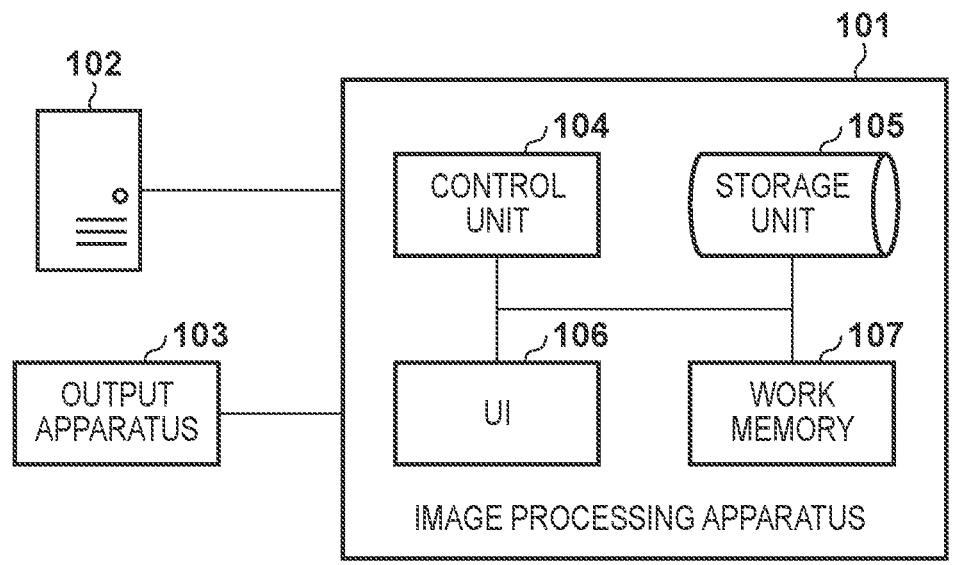
FIG. 1A is a view showing the configuration of an image processing system to which an image processing apparatus according to the first embodiment of the present invention is applied.

FIG. 1A is a view showing the configuration of an image processing system to which an image processing apparatus 101 according to the first embodiment of the present invention is applied.

The image processing apparatus 101 according to the first embodiment is connected to a data server 102 and an output apparatus 103. The data server 102 holds a plurality of texture data to be used by the user to perform decoration processing of reproducing metal texture. The plurality of texture data are input to the image processing apparatus 101.

The image processing apparatus 101 acquires data from the data server 102, and then sends a control instruction to the output apparatus 103 and transfers necessary information and data. An OS as well as a system program according to the embodiment, various application software programs, and parameter data necessary for various processes are stored in a storage unit 105. This storage unit 105 can be formed by a unit represented by a hard disk or a flash ROM. A control unit 104 includes a CPU (Central Processing Unit) 110 (FIG. 1B), and comprehensively controls processing in the image processing apparatus 101 by loading software stored in the storage unit 105 into a work memory 107, and executing it. The hardware arrangement and functional arrangement of the control unit 104 will be described later with reference to FIGS. 1B and 2, respectively. An operation unit (to also be referred to as a "UI" hereinafter) 106 serving as a user interface performs processing associated with user input or display to a user with respect to execution of the above processing, and includes an input device such as a keyboard and a pointing device and a display device such as a display.

The output apparatus 103 is, for example, an inkjet printer, and includes a data transfer unit, a printer control unit, and a print unit. The output apparatus 103 prints, by the inkjet printing method, decoration data acquired from the image processing apparatus 101. In the embodiments to be described later, a case in which the output apparatus 103 is an inkjet printer will be described but the output apparatus 103 may be an electrophotographic printer, a display, or a projector.

Figure 1B:
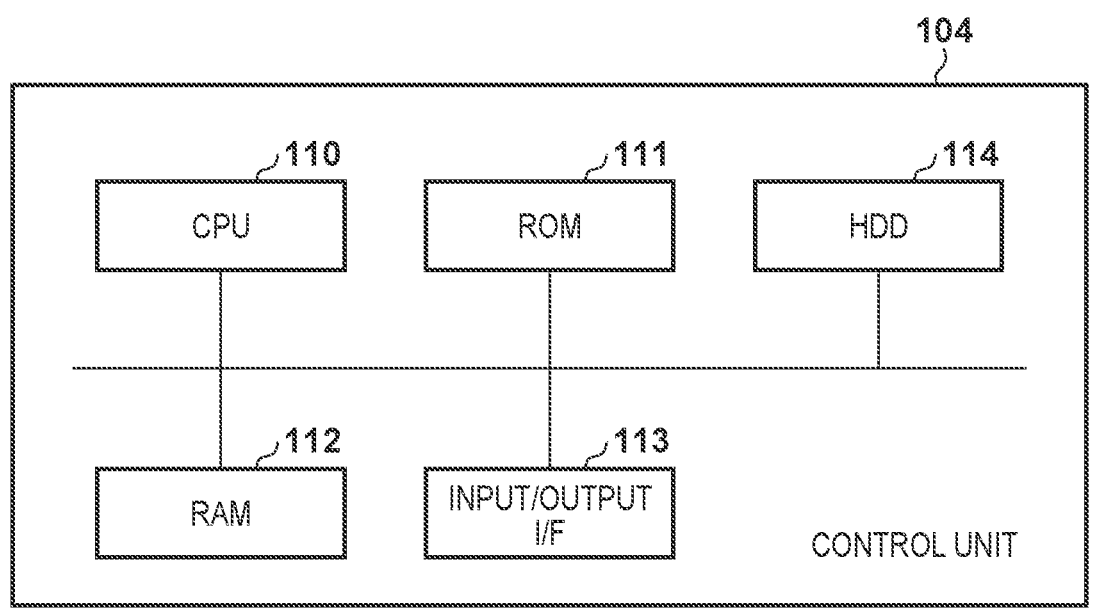
FIG. 1B is a block diagram for explaining the hardware arrangement of a control unit of the image processing apparatus according to the embodiment.

FIG. 1B is a block diagram for explaining the hardware arrangement of the control unit 104 of the image processing apparatus 101 according to the embodiment.

The CPU 110 controls control processing by the control unit 104 by executing a program loaded into a RAM 112 corresponding to the above-described work memory 107. A ROM 111 stores programs, various data, and the like. The RAM 112 provides a work area that stores various data and the like at the time of the operation of the CPU 110, and is also used as a program loading area. An input/output interface (I/F) 113 controls an interface between the control unit 104 and the UI 106 or a network. An HDD (Hard Disk Drive) 114 also functions as the storage unit 105 shown in FIG. 1A, and stores programs and various data.

Figure 2:
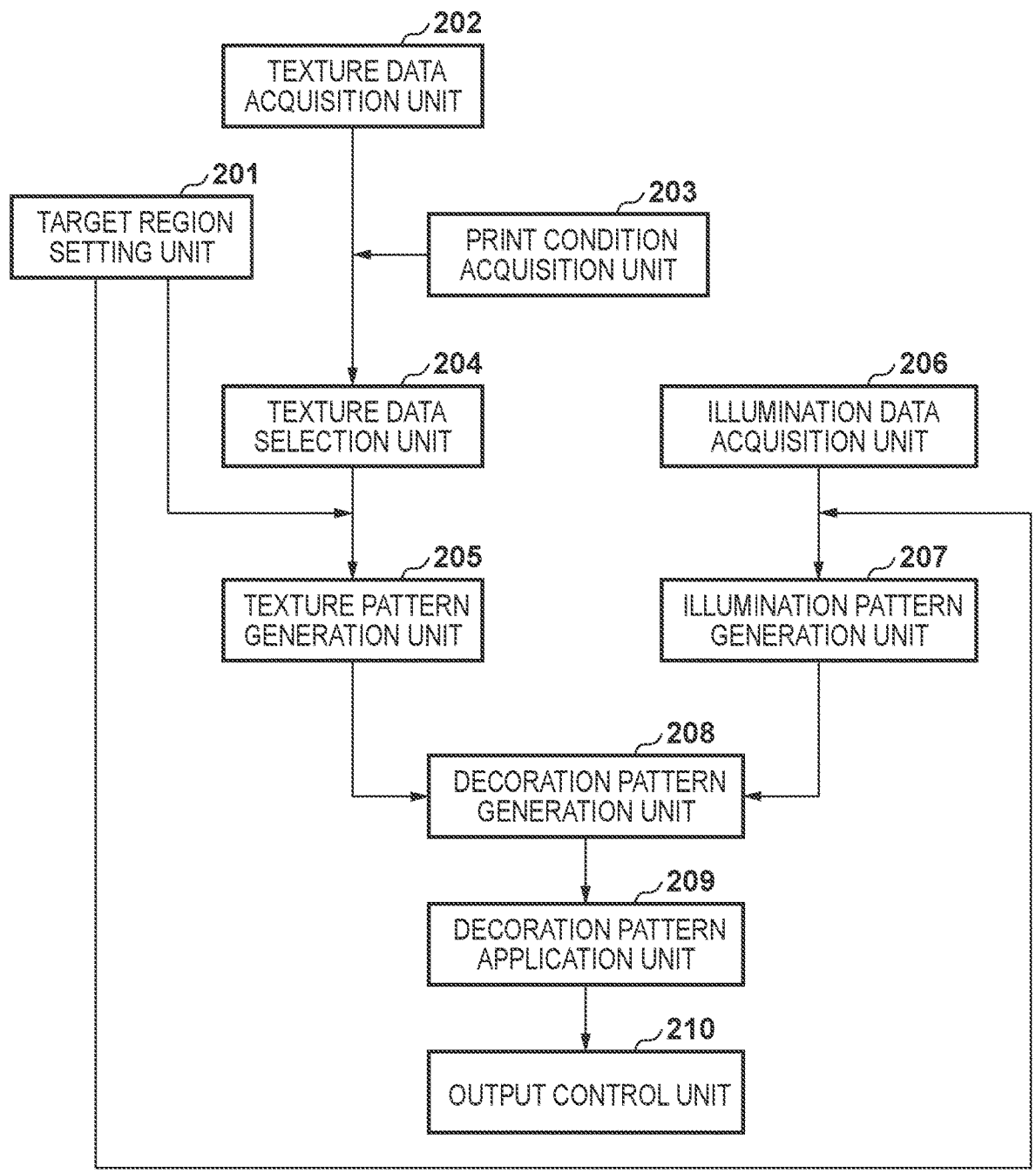
FIG. 2 is a functional block diagram for explaining the functions of the image processing apparatus according to the first embodiment.

FIG. 2 is a functional block diagram for explaining the functions of the image processing apparatus 101 according to the first embodiment.

A target region setting unit 201 acquires coordinate information of an object selected by the user as the target of decoration processing on a UI screen 300 (FIG. 3) (to be described later), and calculates the size of the object. A texture data acquisition unit 202 acquires at least two texture data linked with a decoration pattern selected by the user on the UI screen 300. A print condition acquisition unit 203 acquires a print condition set by the user on the UI screen 300. Note that since printing is exemplified, a print condition is acquired but if, for example, the output apparatus 103 is a display, the print condition may be replaced by an output condition. A texture data selection unit 204 selects, based on the print condition acquired by the print condition acquisition unit 203, one texture data from the plurality of texture data acquired by the texture data acquisition unit 202. A texture pattern generation unit 205 generates a texture pattern corresponding to the object size set by the target region setting unit 201 using the texture data selected by the texture data selection unit 204. An illumination data acquisition unit 206 acquires illumination data linked with the decoration pattern selected by the user on the UI screen 300. An illumination pattern generation unit 207 generates an illumination pattern in accordance with the object size set by the target region setting unit 201 using the illumination data acquired by the illumination data acquisition unit 206. A decoration pattern generation unit 208 generates a decoration pattern by compositing the illumination pattern generated by the illumination pattern generation unit 207 with the texture pattern generated by the texture pattern generation unit 205. A decoration pattern application unit 209 applies the decoration pattern generated by the decoration pattern generation unit 208 to the object selected by the user as the target of the decoration processing on the UI screen 300. An output control unit 210 performs processing of causing the output apparatus 103 to output an image including the object applied with the decoration pattern by the decoration pattern application unit 209.

Figure 3:
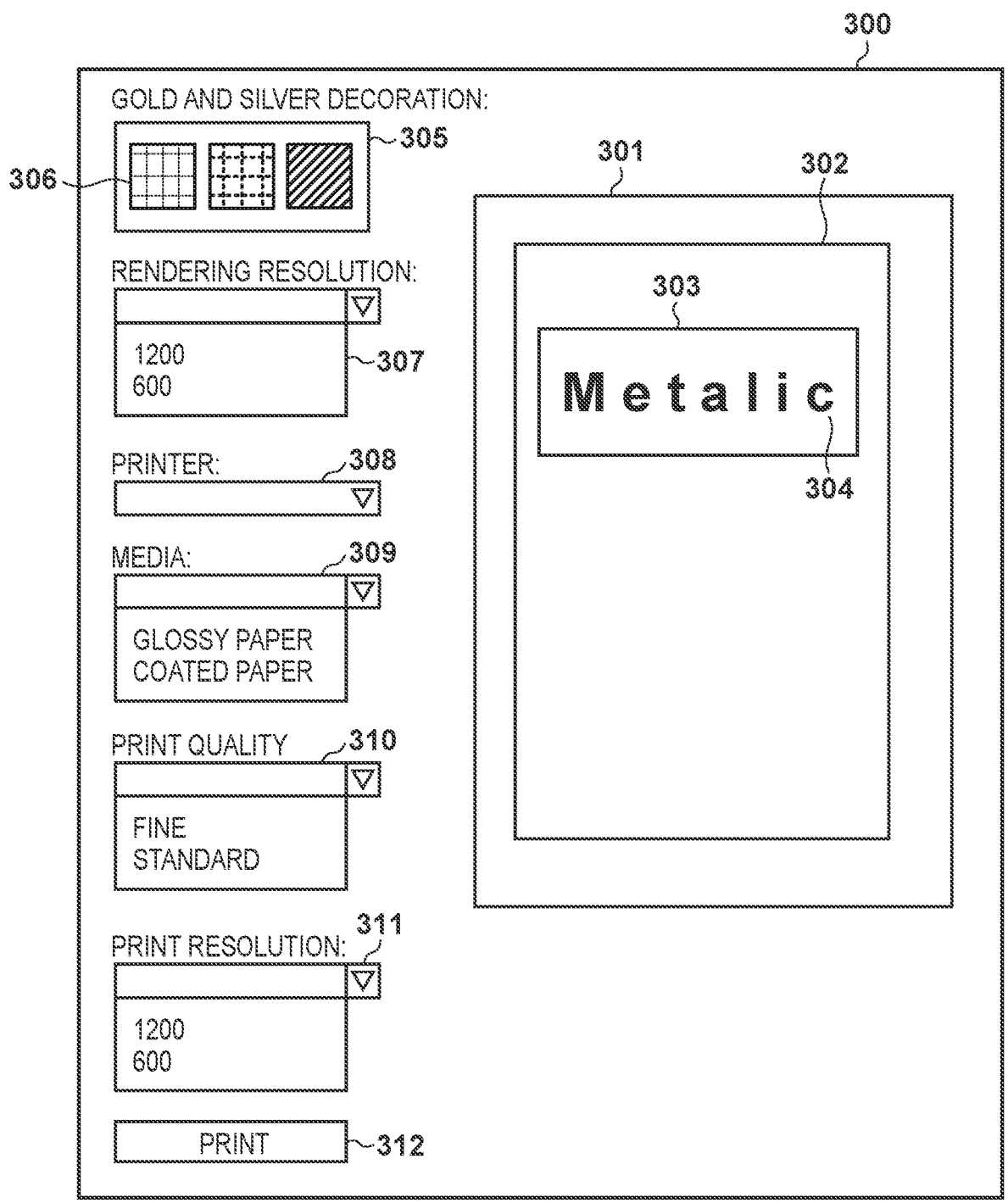
FIG. 3 is a view showing an example of a UI screen when creating decoration data in a UI of the image processing apparatus according to the first embodiment.

FIG. 3 is a view showing an example of a UI screen when creating decoration data in the UI 106 of the image processing apparatus 101 according to the first embodiment.

The UI screen according to the first embodiment includes a texture pattern display region 305 where texture patterns 306 selectable by the user are displayed and an edit data display region 301 where decoration data 302 is displayed. The user designates an application object 303, in the decoration data 302, to which gold and silver decoration is to be applied. Then, if the texture pattern 306 is selected from the texture pattern display region 305, the selected texture pattern can be applied to a decoration target region 304 in the application object 303, thereby performing metal decoration. Furthermore, the UI 106 includes a rendering resolution selection dropdown list 307 to acquire the rendering resolution of the printed decoration data. Furthermore, the UI 106 includes a printer model selection dropdown list 308, a print medium selection dropdown list 309, a print quality selection dropdown list 310, and a print resolution selection dropdown list 311 to make print settings. Then, when a print button 312 is pressed, print processing starts based on the set print settings. Note that the UI shown in FIG. 3 is merely an example, and the UI according to the embodiment is not limited to this.

Figure 4A:
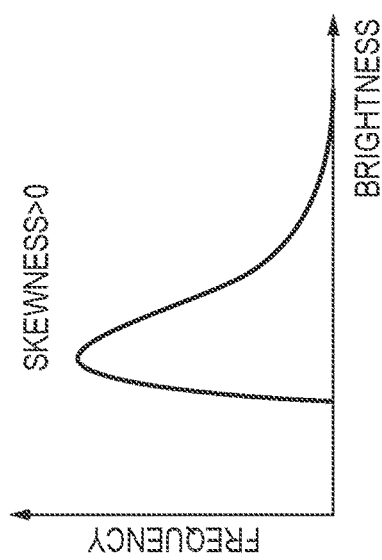
FIGS. 4A to 4C are graphs for explaining the skewness of a luminance histogram in an image.

Next, an image statistic having a correlation with the quality of metal texture in this embodiment will be described with reference to FIGS. 4A to 4C.

An example of the characteristics of a metal substance is strong metallic luster generated when free electrons in the substance and the electromagnetic wave of illumination light generate plasmon resonance. When a person perceives a metal texture, perception of a metallic luster(a metallic luster feeling) is important.

Perception of metal texture by using a perception of luster is the same as in perception of texture of a substance projected on a two-dimensional image. The brain of a person can perceive the metal texture of a substance projected on an image by using, as a key, a statistic in the image having a high correlation with the above-described luster feeling. In recent years, a research result that the skewness of a luminance histogram contributes to the apparent luster feeling of a substance in an image has been reported. The skewness is a statistic representing the unevenness of the histogram in the image, and is calculated using a pixel count n in the image, pixel values xi (i=1, n), the average value x(−) of the pixel values, and a standard deviation s, given by:

$$\text{skewness} = \{n/(n-1)(n-2)\} \times /\{((xi-x(-))/s\}3 \quad (1)$$

Note that Σ represents the sum of values for i from 1 to n.

Figure 4B:
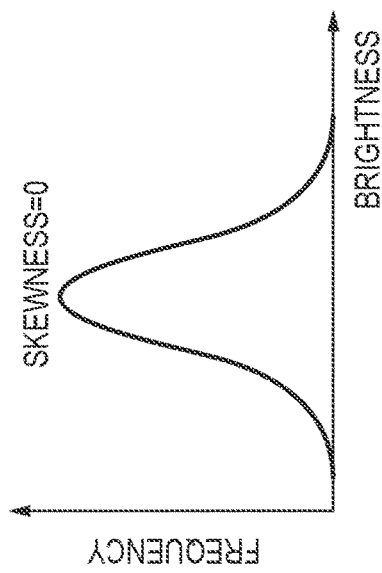
Figure 4C:
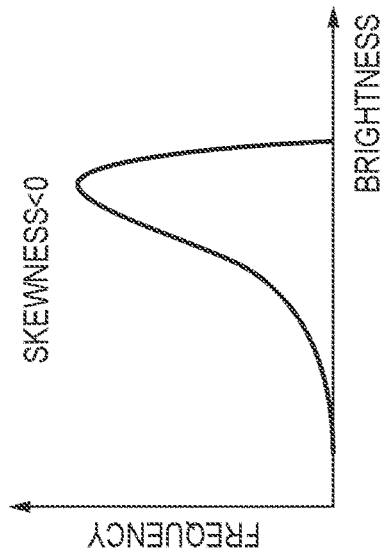

In the case of a bilaterally symmetric distribution, that is, a normal distribution, as shown in FIG. 4B, the skewness is 0. To the contrary, in the case of a distribution which is long on the left side, as shown in FIG. 4A, the skewness is a negative value. In the case of a distribution which is long on the right side, as shown in FIG. 4C, the skewness is a positive value. In Isamu Motoyoshi, et al., "Image statistics and the perception of surface qualities" Nature 447.7141 (2007): 206-209, it is described that as the skewness of a luminance histogram in an image is a larger positive value (FIG. 4C), a higher apparent luster feeling is perceived.

As described above, the luster feeling of the substance is a very important factor in perceiving metal texture. That is, the use of such texture data that the skewness of the luminance histogram in the image is a large positive value improves the apparent luster feeling, that is, the metal texture to be perceived. In this embodiment, a pattern having such image characteristics will be referred to as a "texture pattern" hereinafter, and data obtained by forming an image from a texture pattern will be referred to as "texture data" hereinafter.

Reproduction of color depending on the plasma frequency of metal is also an important factor in perceiving metal texture.

Figure 14:
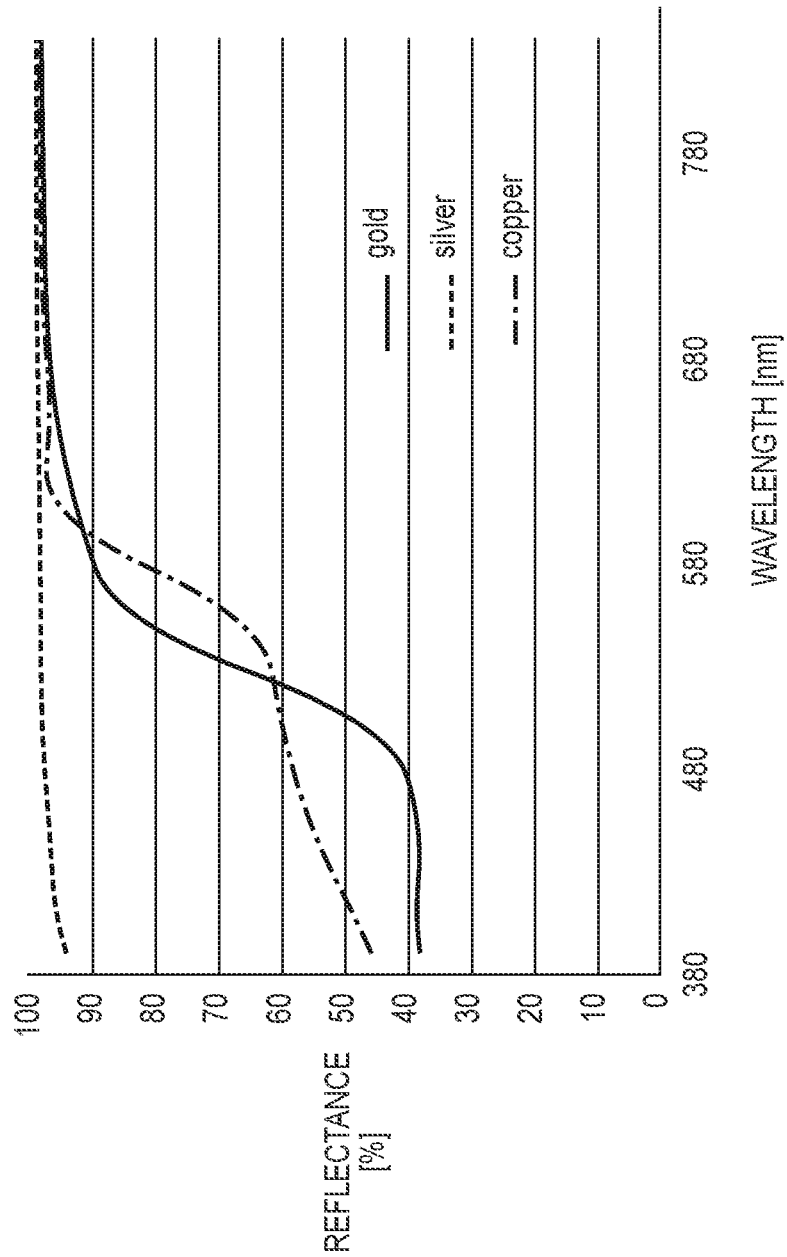
FIG. 14 is a graph showing the wavelength dependencies of the reflectances of gold, silver, and copper.

FIG. 14 is a graph showing the wavelength dependencies of the reflectances of gold, silver, and copper.

Reflected light energy is different depending on the metal due to the natural oscillation frequency. For example, gold exhibits color close to yellow since it cannot completely reflect a short-wavelength component of high energy, and silver exhibits color close to white since it can reflect a short-wavelength component. That is, each metal has unique color depending on the kind of the metal. Therefore, reproduction of the color of the metal also improves metal texture to be perceived.

FIG. 5 is a flowchart for explaining the procedure of processing executed by the image processing apparatus 101 according to the first embodiment. Note that the embodiment describes an example in which the image processing apparatus 101 is outside the output apparatus 103 but the image processing apparatus 101 may be included in the output apparatus 103. The processing illustrated by this flowchart is achieved when the CPU 110 executes a program loaded into the RAM 112.

In step S501, the CPU 110 functions as the target region setting unit 201 to set a decoration target region to which the texture data is to be applied and output the target region to the texture pattern generation unit 205. An example of the decoration target region setting method is a method of setting, as an application object, an object designated by the user on the UI 106, and setting text in the application object 303 as the decoration target region 304, as shown in FIG. 3. Note that the application object or the decoration target region need not be a text object, and may be, for example, a graphic object such as a circle or rhombus, or a clip art such as a medal or trophy. Instead of designating an object, the user may designate two points of the start point of a rectangle and its end point as a diagonal point on the decoration data, thereby setting a rectangular region surrounding the two points as the decoration target region. For example, the background surface of the decoration data may be set as the decoration target region.

FIG. 3 shows an example of designating only one point of the application object 303 as an application object but a plurality of objects may be designated. The decoration target region may automatically be set instead of being set by the user, as a matter of course. For example, when a gold and silver automatic decoration button (not shown) is pressed, a text region having a largest font size in the decoration data may automatically be set as the decoration target region. Alternatively, a region having high attractivity in the decoration data, detected by a known conspicuity detection technique, may be set as the decoration target region. This can create gold and silver decoration data by omitting the user's labor of selecting the decoration region. Even a user inexperience in design can effectively perform gold and silver decoration processing.

Next, the process advances to step S502 and the CPU 110 functions as the texture data acquisition unit 202 to acquire texture data. The texture data are transmitted from the data server 102 to the image processing apparatus 101, and input to the texture data acquisition unit 202. The acquired texture data correspond to the pattern selected by the user as the pattern adapting to the decoration region from the patterns displayed in the texture pattern display region 305. The texture pattern and the texture data input to the texture data acquisition unit 202 will be described in detail later.

Next, the process advances to step S503 and the CPU 110 functions as the illumination data acquisition unit 206 to acquire illumination data. The illumination data is transmitted from the data server 102 to the image processing apparatus 101, input to the illumination data acquisition unit 206, and then output to the illumination pattern generation unit 207. The illumination data acquisition unit 206 acquires illumination data linked with the decoration pattern selected by the user on the UI screen. The illumination pattern and the illumination data will be described in detail later.

Next, the process advances to step S504 and the CPU 110 functions as the print condition acquisition unit 203 to acquire a print condition. In the first embodiment, the print condition acquired by the print condition acquisition unit 203 is "rendering resolution". The rendering resolution acquired by the print condition acquisition unit 203 is output to the texture data selection unit 204. As the rendering resolution, a rendering resolution input by the user via the rendering resolution selection dropdown list 307 shown in FIG. 3 can be acquired. Instead of acquiring the rendering resolution input by the user, the correspondence between print quality and a rendering resolution may be held in advance in the storage unit 105, and a rendering resolution corresponding to print quality designated in the print quality selection dropdown list 310 may be acquired. Alternatively, the correspondence between a rendering resolution and the performance of the control unit 104 or the work memory 107 of the image processing apparatus 101 may be held in advance in the storage unit 105, and a rendering resolution corresponding to the image processing apparatus that executes metal decoration processing may be acquired. For example, the upper limit of an image size processible in the metal decoration processing may be held in advance in the storage unit 105, and a rendering resolution when a poster size exceeds the upper limit and that when the poster size does not exceed the upper limit may be set. That is, any method is possible as long as a rendering resolution for the decoration data can be acquired.

Next, the process advances to step S505 and the CPU 110 functions as the texture data selection unit 204 to select, based on the rendering resolution acquired in step S504, texture data to be used to generate decoration data from the texture data acquired in step S502. The selection method will be described in detail below.

For each of the plurality of texture data acquired by the texture data acquisition unit 202, the texture data selection unit 204 simulates print luminance contrast data based on the rendering resolution acquired by the print condition acquisition unit 203. For each of the thus simulated print luminance contrast data, the skewness of a luminance histogram is calculated by equation (1) above, thereby selecting texture data presenting high skewness. The selected texture data is output to the texture pattern generation unit 205.

The print luminance contrast data calculated by the texture data selection unit 204 will be described next. The print luminance contrast data is data obtained by simulating, in consideration of the resolution characteristics of the output apparatus 103, a luminance contrast output from the output apparatus 103.

First, the texture data is converted into luminance contrast data. If the input texture data is RGB data, it can be converted into YCbCr data using equations (2) to (4) below. The conversion formulas from RGB data into YCbCr data are merely examples and other conversion formulas may be used.

$$Y = 0.299 \cdot R + 0.587 \cdot G + 0.114 \cdot B \quad (2)$$

$$Cb = -0.169 \cdot R - 0.331 \cdot G + 0.5 \cdot B \quad (3)$$

$$Cr = 0.5 \cdot R - 0.419 \cdot G - 0.081 \cdot B \quad (4)$$

Subsequently, a method of simulating the print luminance contrast data by applying the resolution characteristics to the luminance contrast data will be described.

First, the luminance contrast data is converted into frequency data.

Conversion into frequency data can be performed using a known technique such as FFT (Fast Fourier Transform). A frequency included in the luminance contrast data can be calculated based on the pixel count of the texture data and a size after printing. For example, the highest frequency f [cycles/mm] included in the texture data of a size s [mm] of the texture data after printing can be calculated by equation (5) when n [pix] represents the pixel count of the texture data.

$$f = n/2s \quad (5)$$

Each frequency in the texture data calculated based on the pixel count of the texture data and the size after printing, as described above, is multiplied by the resolution characteristics (to be described later). Then, by inversely converting the obtained frequency data into the luminance contrast data, the print luminance contrast data obtained by simulating the characteristics of the contrast actually output from the output apparatus 103 can be acquired.

The resolution characteristics of a printing apparatus will be described next.

Figure 12:
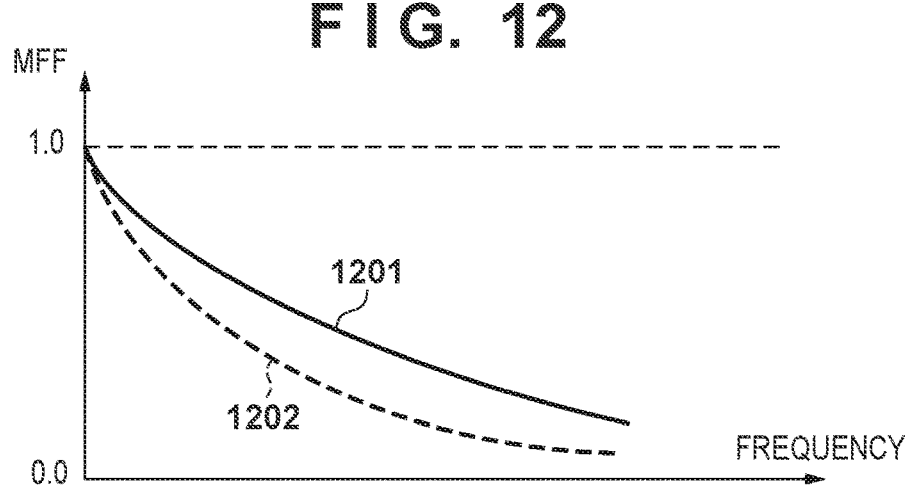
FIG. 12 is a graph showing resolution characteristics in which the abscissa represents a frequency and the ordinate represents the MTF.

In the printing apparatus, the resolution characteristics of rendering data are different from resolution reproduction characteristics (to be referred to as print resolution characteristics hereinafter) when printing data on a target print medium, and the print resolution characteristics change depending on the frequency characteristics of the rendering data. FIG. 12 shows the characteristics.

FIG. 12 is a graph showing print resolution characteristics in which the abscissa represents a frequency and the ordinate represents the MTF.

The MTF represents the production fidelity of the contrast of input data on a print product, and is known to be calculated by a Fourier transform method or contrast method. As the MTF is closer to 1, the contrast of the input data can be reproduced more faithfully, and as the MTF is closer to 0, a print product is more blurred.

Referring to FIG. 12, a solid line 1201 and a broken line 1202 represent resolution characteristics at the time of printing at different rendering resolutions r1 and r2 (r1>r2), respectively. When comparing the contrasts printed at the two rendering resolutions with each other, the solid line 1201>the broken line 1202 is obtained, and thus the contrast output at the rendering resolution r1 is stronger than that output at the rendering resolution r2. That is, when outputting decorated data at a rendering resolution different from that when texture data is created, even the same decorated data changes in degree of reproduction of the contrast.

If decoration data is output under the condition that the print resolution characteristics are lower than those at the time of creating the texture data, the contrast is weaker, and thus the distribution of the brightness histogram of the texture data is narrow around the center of the peak, thereby decreasing the skewness. Therefore, it may be impossible to sufficiently reproduce the assumed metal texture of the texture data, thereby degrading the decoration effect.

The print resolution characteristics change depending on a print method. For example, it is generally known that the resolution characteristics of an inkjet printer are different from those of an electrophotographic printer. That is, it is known that the inkjet printer has a resolution higher than that of the electrophotographic printer. This is because a gradation expression method is different. The inkjet printer adopts a dot dispersion type gradation expression that expresses the gradation by the number of minute dots or a pattern. On the other hand, the electrophotographic printer adopts a dot concentration type gradation expression that generates a halftone screen by collecting a plurality of dots and expresses the gradation by the size of the dots. Therefore, if the texture data created by assuming that it is printed by the inkjet printer is printed by the electrophotographic printer, even the same decorated data changes in resolution. The appearance of the texture data is different from the assumed one, and it may be impossible to sufficiently reproduce the metal texture, thereby degrading the decoration effect.

In the first embodiment, as an example, a case in which the texture data is a rectangle is assumed. However, the texture data is not always a rectangle. In this case, in conformance with the shape of the texture data, the frequency in the texture data may be calculated with reference to the width or the height. Alternatively, the frequency in the texture data may be calculated with reference to the average value of the height and the width.

Next, the process advances to step S506 and the CPU 110 functions as the texture pattern generation unit 205 to cut the texture pattern selected in step S505 to have a shape corresponding to the target region designated in step S501. The process advances to step S507 and the CPU 110 functions as the illumination pattern generation unit 207 to generate an illumination pattern by scaling the illumination data acquired in step S503 in accordance with the size of the application object. Then, the process advances to step S508 and the CPU 110 functions as the decoration pattern generation unit 208 to generate a decoration pattern by compositing the texture pattern generated in step S506 with the illumination pattern generated in step S507.

The process advances to step S509 and the CPU 110 functions as the decoration pattern application unit 209 to composite the decoration pattern generated in step S508 with a decoration application region. As the composition method, for example, the decoration pattern is superimposed on the decoration target region 304 shown in FIG. 3 or the decoration target region 304 is replaced by the decoration pattern. Then, the process advances to step S510 and the CPU 110 functions as the output control unit 210 to perform output control processing of outputting the decoration data created in step S509 from the output apparatus 103.

Next, details of each step of the flowchart shown in FIG. 5 will be described.

FIGS. 6A to 6C are views for explaining details of acquisition of the texture data in step S502.

Referring to FIGS. 6A to 6C, reference numerals 601, 602, and 603 denote texture patterns displayed in the texture pattern display region 305 shown in FIG. 3. Texture data 604, 605, and 606 correspond to the texture patterns 601, 602, and 603, respectively, and each texture pattern is formed by a plurality of different texture data in accordance with the resolution characteristics. The texture data 604, 605, and 606 are saved in the data server 102.

If, for example, the user selects the texture pattern in the texture pattern display region 305 shown in FIG. 3, the plurality of texture data linked with the selected texture pattern are acquired from the data server 102. This embodiment has explained the example of acquiring a plurality of texture data directly from the data server 102 but texture data acquired in advance in the storage unit 105 may be acquired, as a matter of course.

FIG. 7 is a flowchart for explaining the processing of selecting the texture data in step S505 of FIG. 5.

In step S701, the CPU 110 acquires the resolution characteristics with respect to the print condition (the rendering resolution in this example) acquired in step S504. The process advances to step S702 and the CPU 110 calculates luminance contrast data using equations (2) to (4) with respect to the texture data acquired in step S502. The process advances to step S703 and the CPU 110 simulates the print luminance contrast data based on the resolution characteristics acquired in step S701 with respect to the luminance contrast data calculated in step S702. The process advances to step S704 and the CPU 110 calculates skewness using equation (1) with respect to the print luminance contrast data calculated in step S703. The process advances to step S705 and the CPU 110 determines whether the processing has been applied to all the texture data acquired in step S502. If the processing has ended for all the texture data, the process advances to step S706; otherwise, the process returns to step S702 to repeat the processes in step S702 to S704. In step S706, the CPU 110 selects the texture data to be used for gold and silver decoration processing based on the skewness calculated in step S704. At this time, the texture data presenting the highest calculated skewness is selected.

As another selection method, in the texture data lists shown in FIGS. 6A to 6C, reference texture data as a reference is decided in advance, and the texture data presenting the skewness higher than that calculated from the reference texture data may be selected. If a plurality of texture data are candidates, the texture data with average luminance closest to that of the reference texture data may be selected or the texture data with a hue or chroma closest to that of the reference texture data may be selected. The texture data other than the texture data farthest in color from the reference texture data need only be selected from the plurality of candidates. That is, the texture data presenting the skewness higher than that calculated from the reference texture data need only be selected.

As described above, by selecting the texture data presenting the high skewness on output data obtained by simulating the actual print state, the texture data with high metal texture with the assumed resolution characteristics can be selected.

The example of executing steps S701 to S706 after the acquisition of the rendering resolution in step S504 and selecting the texture data has been described above with reference to FIG. 7. The embodiment, however, is not limited to this. For example, the processes in steps S701 to S705 may be applied in advance to each held texture data in accordance with the assumed resolution characteristics. That is, a correspondence table (for example, FIG. 9A) that registers appropriate texture data in association with a rendering resolution is held in advance in the storage unit 105, and the appropriate texture data is selected in accordance with the rendering resolution acquired in step S504 with reference to the correspondence table. This can omit part of the processing of selecting the texture data, thereby shortening the processing time.

Another example of the method of selecting the texture data is a method of creating in advance such texture data that the skewness is high at a given rendering resolution and deciding the correspondence of the texture data presenting high skewness at the rendering resolution.

FIG. 8 is a flowchart for explaining the processing of simulating the print luminance contrast data in step S703 of FIG. 7.

In step S801, the CPU 110 acquires resolution characteristics corresponding to the rendering resolution acquired in step S701. The process advances to step S802 and the CPU 110 applies the resolution characteristics acquired in step S801 to the reference texture data. The process advances to step S803 and the CPU 110 calculates the difference between the texture data before and after the application of the resolution characteristics. Then, the process advances to step S804 and the CPU 110 adds the difference calculated in step S803 to the reference texture data.

In this method, at the rendering resolution at the time of creating the texture data, texture data of a resolution higher than that of the reference texture data can be created. Therefore, texture data having higher skewness can be created and held. By measuring resolution characteristics at an appropriate rendering resolution and emphasizing frequency components deteriorating due to the resolution characteristics with respect to the reference texture data, it is also possible to create texture data having higher skewness.

Another creation method is a method of scaling the texture data created for the reference rendering resolution at a ratio between the reference rendering resolution and the rendering resolution for creation. For example, when creating texture data for 300 dpi with reference to texture data created for 600 dpi, the ratio between the rendering resolutions is 0.5, and thus the texture data created for 600 dpi is reduced to half in the vertical and horizontal direction.

Figure 13:
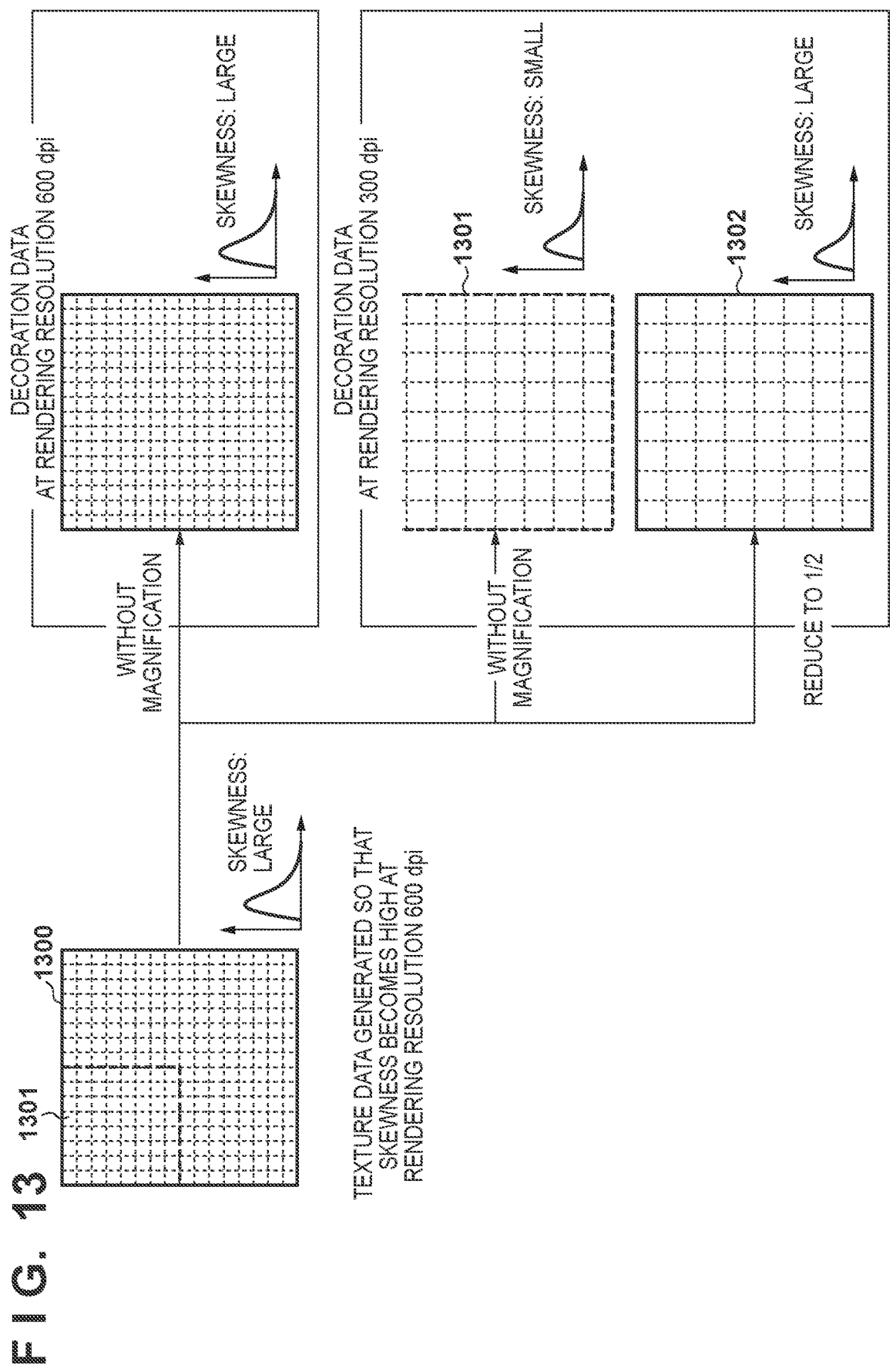
FIG. 13 is a view for explaining the effect of scaling of texture data according to the first embodiment.

FIG. 13 is a view for explaining the effect of scaling of texture data according to the first embodiment.

In FIG. 13, texture data 1300 created to present high skewness when the rendering resolution is 600 dpi is considered as a reference. There is no problem even if the texture data is applied without magnification when the rendering resolution is 600 dpi. On the other hand, if the texture data 1300 is applied intact when the rendering resolution is 300 dpi, only a part 1301 of the texture data is decorated. Thus, when an originally assumed brightness distribution presenting high skewness changes to decrease the skewness, it is impossible to sufficiently reproduce metal texture, thereby degrading the decoration effect.

To the contrary, as indicated by 1302, if the texture data is scaled by 0.5 and then applied, decoration can be performed in consideration of the whole texture data. Since, therefore, the originally assumed brightness distribution presenting high skewness can generally be maintained, it is possible to sufficiently reproduce metal texture. That is, in this method, even if the rendering resolution is different from that at the time of creating the texture data, the brightness distribution shape of the texture data can be maintained, thereby creating texture data having higher skewness.

With respect to the correspondence between the rendering resolution and the texture data presenting high skewness, a threshold may be set for the rendering resolution and the texture data to be selected may be switched between a case in which the rendering resolution is equal to or higher than the threshold and a case in which the rendering resolution is lower than the threshold. As shown in FIG. 9A, a reference table for linking a rendering resolution and texture data to be selected may be held.

FIG. 9A is a table showing an example of the reference table for linking the rendering resolution with texture data.

FIG. 9B is a view for explaining the texture pattern generation processing. FIG. 10 is a flowchart for explaining the texture pattern generation processing in step S506 of FIG. 5. The texture pattern generation processing executed in step S506 will be described below with reference to FIGS. 9B and 10.

In step S1001, the CPU 110 determines whether the size of the texture data selected in step S505 is smaller than the size of the target region of the application object. If it is determined that the size of the texture data is smaller than the size of the target region of the application object, the process advances to step S1002; otherwise, the process advances to step S1003. In this embodiment, the comparison between the sizes indicates comparison between each of the long and short sides of the texture data and each of the long and short sides of the target region of the application object. If the size of the texture data is larger than that of the target region of the application object with respect to at least one of the long and short sides, the process advances to step S1003.

In step S1002, the CPU 110 tiles texture data 900, as shown in FIG. 9B. This tiling processing is performed until the size of each of the short and long sides of the tiled texture data becomes equal to or larger than, for example, the size of each of the short and long sides of the application object 303 shown in FIG. 3. When performing the tiling processing, tiling may be performed so that the texture data do not overlap each other or the texture data are allowed to overlap each other to some extent.

In step S1003, the CPU 110 aligns the texture data acquired in step S1001 or S1002 with the target region of the application object, and then clips the texture data in conformance with the shape of the decoration target region, thereby generating a texture pattern. As an example of the method of aligning the texture data with the application object is a method of performing alignment with reference to the upper left positions of the texture data and the target region of the application object. Alignment need not be performed with reference to the upper left positions, as a matter of course. That is, alignment need only be performed so that the texture data exists in the entire decoration target region. Then, the aligned texture data is clipped in conformance with the shape of the decoration target region. As the clipping method, for example, a mask image of the decoration target region may be generated using RGB values as thresholds, and applied to the texture data, thereby performing clipping. Furthermore, if the application object is data in the SVG format, the SVG clipPath function may be used. That is, any method can be used as long as the texture data can be clipped in conformance with the shape of the decoration target region.

Figure 11:
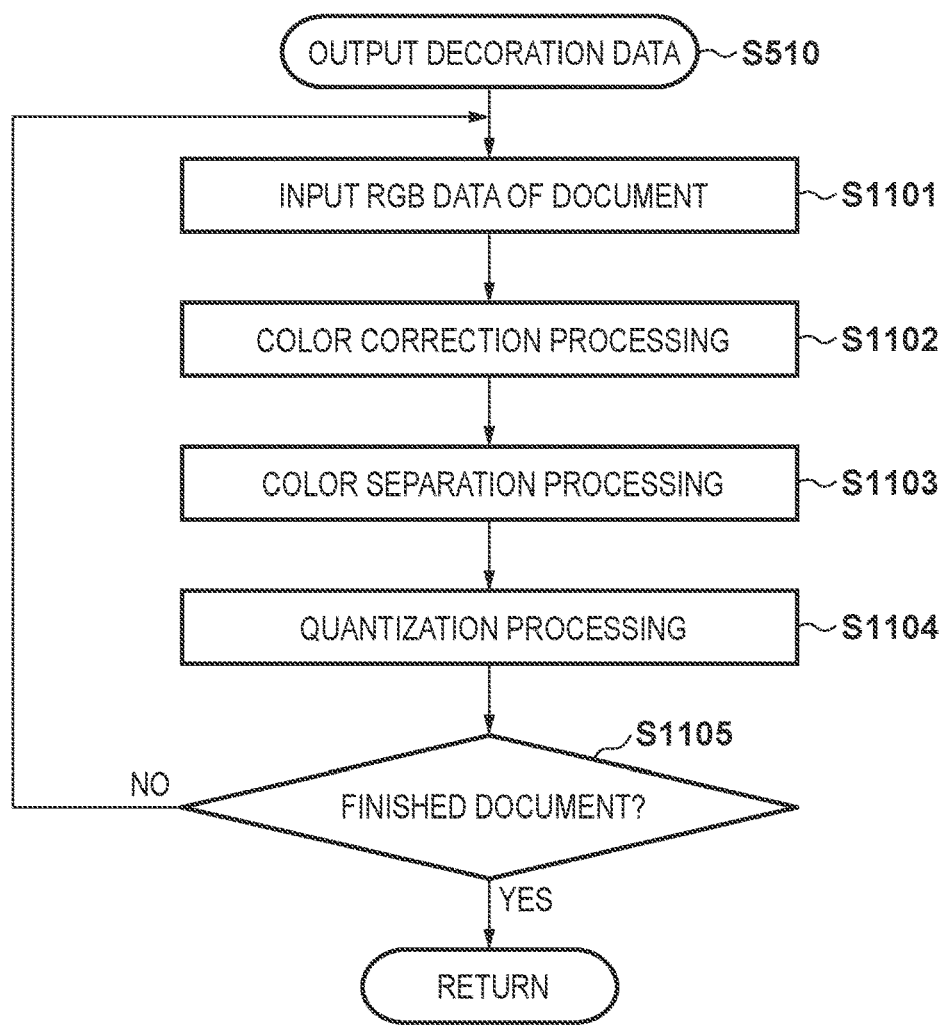
FIG. 11 is a flowchart for explaining decoration data output processing in step S510 of FIG. 5.

FIG. 11 is a flowchart for explaining the decoration data output processing in step S510 of FIG. 5.

In step S1101, the CPU 110 inputs an RGB image of a document having undergone the decoration processing in step S509. The process advances to step S1102, and the CPU 110 performs color correction processing of converting the RGB color of the document into, for example, RGB values suitable for printing. As the color correction processing, known preferable processing may be used. The process advances to step S1103, and the CPU 110 performs color separation processing of converting the RGB values into use amounts of inks. As the method of the color separation processing, known preferable processing may be used. As assumed inks, color separation processing into CMYK inks or color separation processing into inks including spot color ink such as metallic ink may be possible. Next, the process advances to step S1104, and the CPU 110 performs quantization processing of converting the use amount of the color ink of each printhead into the presence/absence of a dot to be actually printed. As the quantization processing, any method such as known error diffusion processing or dither processing may be used. If the thus quantized dot data is transmitted to the printheads, and preparation of dot data for one scan is complete, actual printing is executed on a print sheet using the printheads. In step S1105, the CPU 110 determines whether the processing is complete for all the pixels of the document. If it is determined that the processing is complete, the process ends; otherwise, the process returns to step S1101 and the remaining document is processed. After that, by repeatedly performing the processes in step S1101 to S1105 until the processing for the image data of the document ends.

The first embodiment has explained the case in which the texture data is selected in accordance with the rendering resolution. However, another print condition that influences the print resolution characteristics may be used instead of the rendering resolution. For example, even if the print method, the printer model, the medium type, or the print quality is used, the same processing can be performed.

For example, in the UI 106, whether the print method is the method of the inkjet printer or that of the electrophotographic printer can be determined based on the printer model designated by the user, and the texture data to be selected can be switched in accordance with the print method. The same processing can be performed under a combination of a plurality of print conditions of the rendering resolution and the print method.

An effect associated with the first embodiment of the present invention will be described next.

As shown in FIG. 12, if the decoration data print processing is performed at different rendering resolutions, even the same decorated data changes in degree of reproduction of the contrast. If the decoration data is output under a condition that the resolution characteristics are lower than those at the time of creating the texture data, the contrast is weaker, and thus the brightness distribution of the texture data is narrow around the center of the peak, thereby decreasing the skewness. Therefore, it may be impossible to sufficiently reproduce the assumed metal texture of the texture data, thereby degrading the decoration effect.

The resolution characteristics also change depending on the print method. For example, it is generally known that the inkjet printer has a resolution higher than that of the electrophotographic printer. This is because a gradation expression method is different. The inkjet printer adopts a dot dispersion type gradation expression that expresses the gradation by the number of minute dots or a pattern. On the other hand, the electrophotographic printer adopts a dot concentration type gradation expression that generates a halftone screen by collecting a plurality of dots and expresses the gradation by the size of the dots. Therefore, the inkjet printer that can express an image by smaller dots can implement an expression at a resolution higher than that of the electrophotographic printer.

Therefore, if the texture data created by assuming that it is output by the inkjet printer is output by the electrophotographic printer, even the same decorated data changes in resolution. The appearance of the texture data is thus different from the assumed one, and it may be impossible to sufficiently reproduce the metal texture, thereby degrading the decoration effect.

According to the first embodiment, by switching texture data output to present high skewness in accordance with the assumed resolution characteristics and using it, it is possible to suppress deterioration in metal decoration effect.

According to the first embodiment, appropriate texture data is selected from a plurality of acquired texture data in accordance with a rendering resolution as information concerning resolution characteristics, and used for decoration processing. However, one reference texture data can be acquired, corrected in accordance with the rendering resolution of decoration data, and then used for decoration processing. Information concerning resolution characteristics when observing data having undergone metal decoration by texture data may be acquired, and then the reference texture data acquired in advance may be corrected so that the skewness is high in an image output with the resolution characteristics, and used. This can perform processing by saving a memory, as compared with a case in which a plurality of texture data are held.

The above embodiment has explained the example of creating decoration data to be output to the inkjet printer. However, when the created decoration data is displayed, that is, preview-displayed on the display, the texture data may be switched in accordance with the rendering resolution set in the rendering resolution selection dropdown list 307. In addition to the printed decoration data set in the rendering resolution selection dropdown list 307, another resolution for the preview display displayed on the display may be set, and the texture data may be switched in accordance with the display resolution for the preview display with respect to the decoration data for preview display. This makes it possible to create decoration data while confirming in advance, on the display unit, metal texture reproduced in the texture data after printing.

Figure 19:
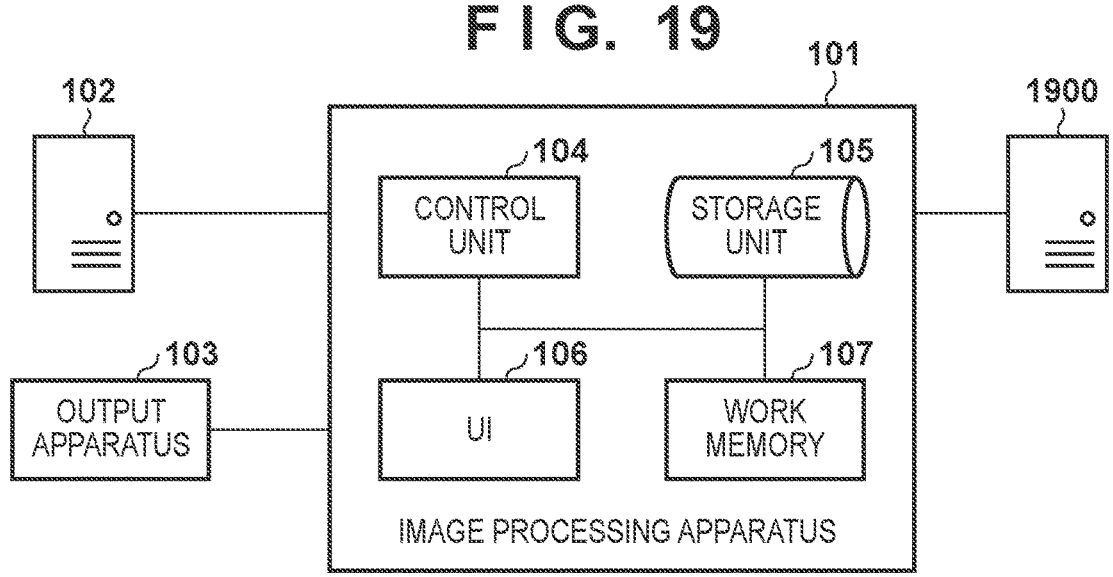
FIG. 19 is a view showing the configuration of an image processing system to which an image processing apparatus according to a modification of the first embodiment of the present invention is applied.

In the first embodiment, the arrangement in which the functions in the functional block diagram shown in FIG. 2 are implemented in the image processing apparatus 101 has been exemplified. However, some of the functions may be implemented outside the image processing apparatus, for example, in a processing server 1900 shown in FIG. 19.

Examples of the processing server 1900 are an on-premise physical server and a virtual server configured on a cloud service. The data server 102 may be included in the processing server 1900, as a matter of course. If the capacity of the decoration data is very large (for example, the decoration data is of the A0 size), some of the components of the functional blocks with high processing loads are implemented in the processing server having processing capability higher than the image processing apparatus, thereby making it possible to speed up the processing. In addition, since only the functional blocks with low processing loads can be implemented in the image processing apparatus 101, the processing capability of the image processing apparatus 101 may be made lower than that of the processing server 1900. That is, an operation using the image processing apparatus such as a smartphone or a tablet terminal can be performed, thereby facilitating creation of decoration data by a remote operation.

Second Embodiment

The first embodiment has explained the example of acquiring a rendering resolution as information concerning a print condition, selecting appropriate texture data from a plurality of acquired texture data in accordance with the rendering resolution, and using the texture data for decoration processing. To the contrary, according to the second embodiment, appropriate texture data is selected from a plurality of acquired texture data based on information concerning a color gamut as a print condition and used for decoration processing. Then, obtained decoration data is output to a printing apparatus. An arrangement and processing according to the second embodiment will be described below with reference to FIGS. 15 to 18. The configuration of an image processing system and the arrangement of functional blocks according to the second embodiment are the same as those according to the above-described first embodiment and a description thereof will be omitted.

Figure 15:
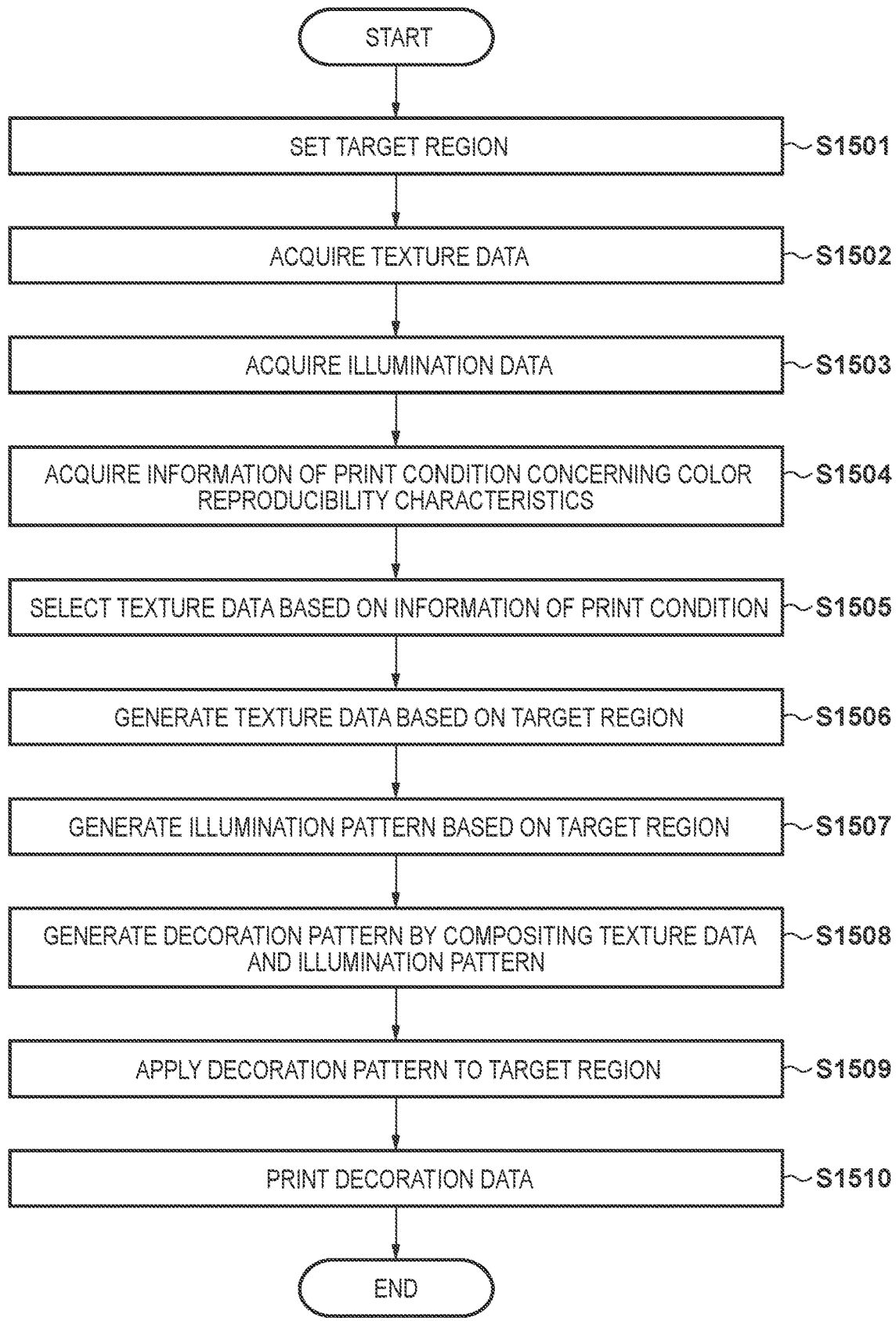
FIG. 15 is a flowchart for explaining the procedure of processing executed by an image processing apparatus according to the second embodiment.

FIG. 15 is a flowchart for explaining the procedure of processing executed by an image processing apparatus 101 according to the second embodiment. This flowchart corresponds to FIG. 5 in the above-described first embodiment, processes in steps S1501 to S1503 of FIG. 15 are the same as those in steps S501 to S503 of FIG. 5, respectively, and a description thereof will be omitted. However, in step S502, the texture data 604, 605, and 606 are formed by the plurality of texture data according to the resolution characteristics. However, in step S1502, texture data 604, 605, and 606 are formed by a plurality of texture data according to color reproducibility characteristics.

In step S1504, a print condition concerning color reproducibility characteristics, which is different from step S504, is acquired. The print condition acquired by a CPU 110 in step S1504 is a condition concerning a color gamut. The color gamut is generally decided based on a printer type, a target print medium (to also be referred to as a medium hereinafter), print quality, and the like. Each element can be set on a UI screen 300 shown in FIG. 3. In FIG. 3, a printer type (model) is set in a printer model selection dropdown list 308, a target print medium type is set in a print medium selection dropdown list 309, and print quality is set in a print quality selection dropdown list 310. In this example, all these print conditions can be set on the UI screen but these can be omitted when a printer that does not have some settings or the like is used.

The process advances to step S1505 and the CPU 110 selects, based on the print condition information concerning the color reproducibility characteristics acquired in step S1504, from the texture data acquired in step S1502, texture data to be used to generate print data to be used for a decoration portion. In this way, the texture data is selected based on the print condition information. In step S1506 to S1510, the same processes as those in steps S506 to S510 of FIG. 5 in the first embodiment are executed, thereby outputting (printing) decoration data.

Figure 16:
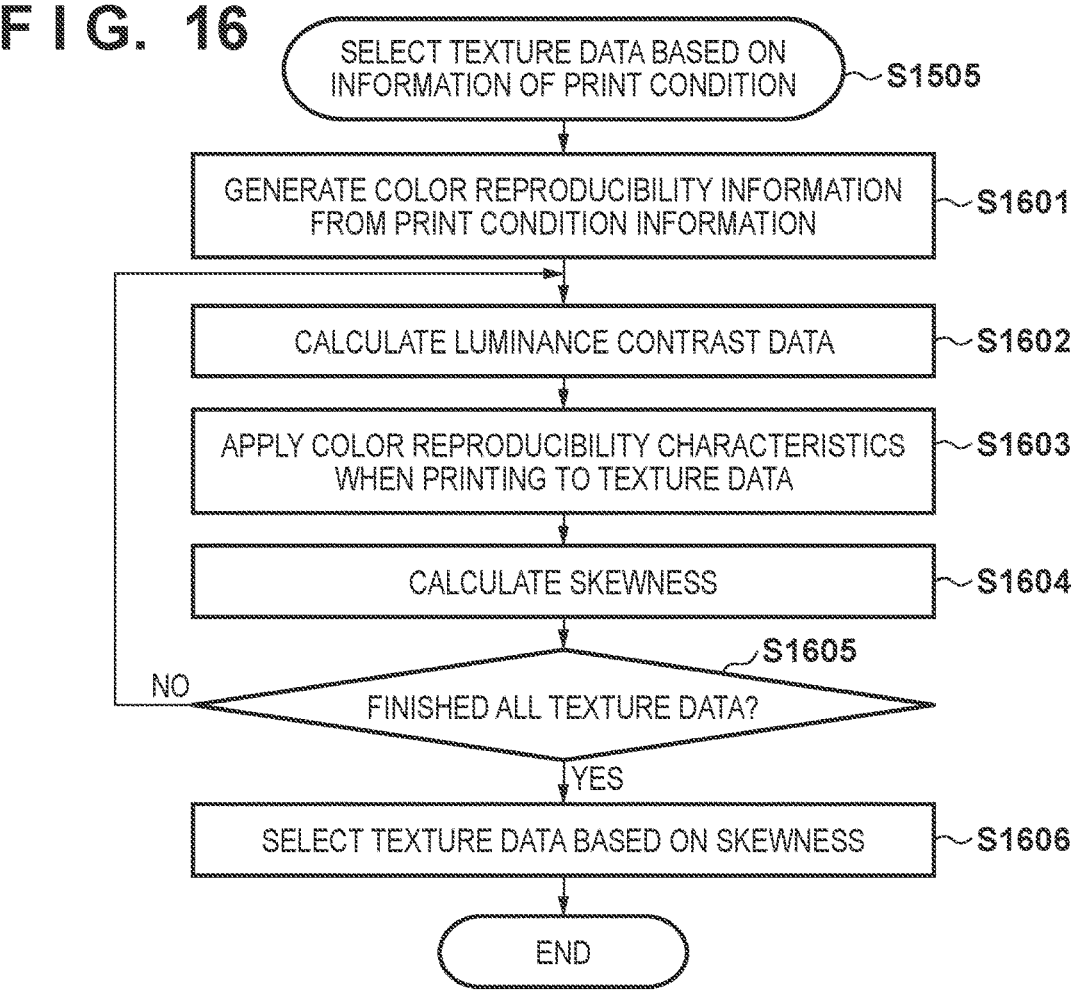
FIG. 16 is a flowchart for explaining processing, in step S1505 of FIG. 15, of selecting, based on print condition information, texture data to be used to generate print data to be used for a decoration portion according to the second embodiment.

FIG. 16 is a flowchart for explaining the processing, in step S1505 of FIG. 15, of selecting, based on the print condition information, the texture data to be used to generate print data to be used for the decoration portion. This flowchart corresponds to FIG. 7 in the first embodiment.

In step S1601, the CPU 110 generates color reproducibility information based on the print condition information acquired in step S1504. The color reproducibility information can be generated by forming a database by performing, in advance, color gamut measurement for each print condition and selecting data from the database based on the designated print condition. There are proposed various methods as the color gamut measurement method.

However, the second embodiment is independent of the measurement method, and may use any measurement method.

Next, the process advances to step S1602 and the CPU 110 calculates luminance contrast data using equations (2) to (4) with respect to the acquired texture data. The process advances to step S1603 and the CPU 110 simulates print luminance contrast data. In step S703 of FIG. 7, the print luminance contrast data is simulated based on the rendering resolution. In the second embodiment, however, the print luminance contrast data is simulated based on the information concerning the color reproduction region acquired in step S1601. The process advances to step S1604 and the CPU 110 calculates skewness using equation (1) with respect to the print luminance contrast data. In step S1605, the CPU 110 determines whether the processing has been applied to all the texture data, and repeats the processes in steps S1602 to S1604 until the processing of all pixels ends. In step S1606, the same processing as that in step S706 of FIG. 7 is executed.

Figure 17:
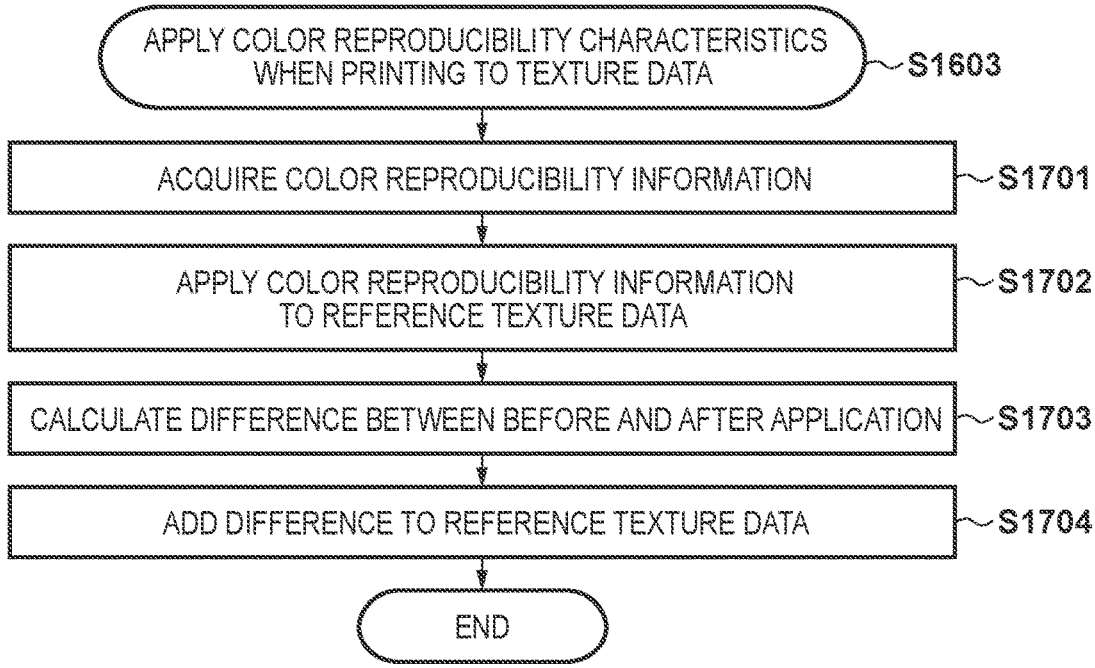
FIG. 17 is a flowchart for explaining processing in step S1603 of FIG. 16 according to the second embodiment of the present invention.

The simulation method in step S1603 is performed in accordance with, for example, a flowchart shown in FIG. 17. However, the processing may be performed in advance for each print condition to generate data or the procedure may be performed at the time of executing step S1603.

FIG. 17 is a flowchart for explaining the processing, in step S1603 of FIG. 16, of applying the color reproducibility characteristics to the texture data according to the second embodiment of the present invention.

In step S1701, the CPU 110 acquires the color reproducibility information generated in step S1601. The process advances to step S1702 and the CPU 110 applies the color reproducibility information acquired in step S1701 to the reference texture data. The process advances to step S1703 and the CPU 110 calculates the difference between the texture data before and after the application of the color reproducibility information. Then, the process advances to step S1704 and the CPU 110 adds the difference calculated in step S1703 to the reference texture data, thereby ending the process.

Figure 18A:
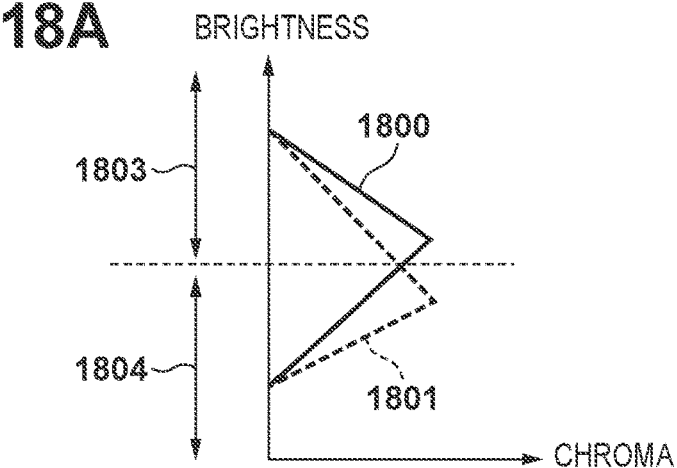
FIG. 18A is a graph for explaining color reproducibility information.

FIG. 18A is a graph for explaining the color reproducibility information. This graph shows the color gamut of an output produce at a given hue angle, in which the abscissa represents the chroma and the ordinate represents the brightness. It is known that this color gamut changes depending on the print conditions of the print method, the printer model, the medium, and the like.

Referring to FIG. 18A, a solid line 1800 and a broken line 1801 represent the color gamuts that can be output by different printer models d1 and d2, respectively. When comparing the color gamuts output by the two printer models with each other, the solid line 1800>the broken line 1801 in a target region including a high-brightness region 1803, and thus the color gamut output by the printer model d1 is wider than that output by the printer model d2. On the other hand, since the solid line 1800<the broken line 1801 in a target region including a low-brightness region 1804, the color gamut output by the printer model d2 is wider than that output by the printer model d1.

An effect associated with the second embodiment of the present invention will be described next.

As shown in FIG. 18A, if a printer model different from that when the texture data is created outputs decorated data, even the same decorated data changes, depending on the printer model, in brightness regions in which the wide color gamut and the narrow color gamut are output. Therefore, the appearance of the texture data is different from the assumed one, and it may be impossible to sufficiently reproduce metal texture, thereby degrading the decoration effect.

According to the second embodiment, by switching the texture data in accordance with the color gamut where the texture data is assumed to be output to present high skewness and using it, it is possible to suppress deterioration in metal decoration effect.

(Modification)

In the above-described embodiment, the brightness-chroma characteristics shown in FIG. 18A have been explained as the color reproducibility characteristics. To the contrary, luminance reproducibility characteristic (luminance dynamic range) may particularly be specialized among the color reproducibility characteristics. The metal decoration effect largely depends on the skewness characteristics of the luminance, and the print characteristics of the luminance dynamic range may be substituted in the second embodiment.

This example will be described with reference to FIG. 18B.

Figure 18B:
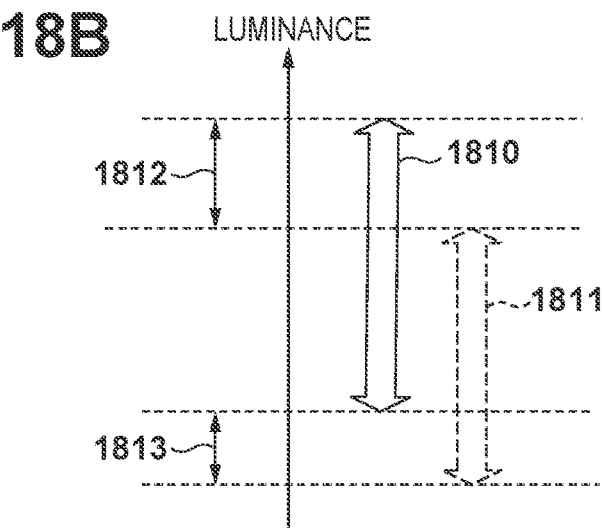
FIG. 18B is a view showing the dynamic range of an output product in which the ordinate represents a luminance.

FIG. 18B is a view showing the dynamic range of an output product in which the ordinate represents the luminance. It is known that this dynamic range changes depending on the print conditions of the medium, the printer model, and the like.

Referring to FIG. 18B, a solid line 1810 and a broken line 1811 represent the dynamic ranges that can be output in different media m1 and m2, respectively. When comparing the dynamic ranges output with the two media with each other, the dynamic range can be output only in the medium m1 in a target region including a high-luminance region 1812. On the other hand, the dynamic range can be output only in the medium m2 in a target region including a low-luminance region 1813.

That is, if decorated data is output using a different medium different from that when the texture data is created, the luminance region that can or cannot be output changes depending on the medium even for the same decorated data. Therefore, the appearance of the texture data is different from the assumed one, and it may be impossible to sufficiently reproduce metal texture, thereby degrading the decoration effect.

According to the modification, by switching the texture data to be output to present high skewness in accordance with the assumed dynamic range and using it, it is possible to suppress deterioration in metal decoration effect.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-126882, filed Aug. 2, 2021, which is hereby incorporated by reference herein in its entirety.

What is claimed is:

1. An image processing apparatus comprising:
a setting unit configured to set a target region;
a first acquisition unit configured to acquire a plurality of texture data for applying a metal representation on an image;
a second acquisition unit configured to acquire an output condition when outputting the target region;
a selection unit configured to select texture data based on the output condition; and
an application unit configured to apply, to the target region, the texture data selected by the selection unit,
wherein the selection unit selects texture data from the plurality of texture data based on skewness of a histogram of luminance contrast data when the plurality of texture data are output, and
wherein (a) at least one processor and at least one memory, (b) circuitry, or (c) circuitry, at least one processor, and at least one memory are configured to act as a plurality of units comprising the first acquisition unit and the second acquisition unit.

2. The apparatus according to claim 1, wherein the plurality of units further comprises the setting unit, the selection unit, and the application unit.

3. The apparatus according to claim 1, wherein the second acquisition unit acquires information concerning resolution characteristics as the output condition when outputting the target region, and
wherein the selection unit selects texture data from the plurality of texture data based on skewness of a histogram of luminance contrast data when the plurality of texture data are output with the resolution characteristics.

4. The apparatus according to claim 1, wherein the second acquisition unit acquires information concerning a color gamut as the output condition when outputting the target region, and
wherein the selection unit generates color reproducibility information based on the information concerning the color gamut, and selects texture data from the plurality of texture data based on skewness of a histogram of luminance contrast data when the plurality of texture data are output with the color reproducibility information.

5. The apparatus according to claim 4, wherein the color reproducibility information is luminance reproducibility information.

6. The apparatus according to claim 1, wherein the selection unit selects such texture data that the skewness of the histogram of the luminance contrast data indicates a positive value.

7. The apparatus according to claim 1, wherein the selection unit decides reference texture data from the plurality of texture data, and selects such texture data that the skewness is larger than skewness of a histogram of luminance contrast data of the reference texture data.

8. The apparatus according to claim 7, wherein if there are a plurality of texture data each presenting the skewness larger than the skewness of the histogram of the luminance contrast data of the reference texture data, the selection unit selects texture data close in color to the reference texture data.

9. The apparatus according to claim 8, wherein the color includes a hue, a chroma, and/or an average luminance.

10. The apparatus according to claim 1, further comprising a storage unit configured to store texture data corresponding to the output condition, wherein the selection unit selects the texture data with reference to the storage unit in accordance with the output condition acquired by the second acquisition unit.

11. The apparatus according to claim 1, wherein the first acquisition unit acquires a plurality of texture data that correspond to a texture pattern selected via a screen and correspond to a plurality of output conditions.

12. The apparatus according to claim 1, further comprising an illumination data acquisition unit configured to acquire illumination data,
wherein the application unit further composites an illumination pattern based on the illumination data with the texture data selected by the selection unit, and applies obtained data to the target region.

13. The apparatus according to claim 1, further comprising a correction unit configured to correct the texture data so that skewness of a histogram of luminance contrast data when the texture data is output based on the output condition indicates a large positive value,
wherein the texture data corrected by the correction unit is applied to the target region.

14. The apparatus according to claim 13, wherein the correction unit corrects the texture data by applying resolution characteristics included in the output condition to the texture data, and adding, to the texture data before the resolution characteristics are applied, a difference between the texture data before the resolution characteristics are applied and the texture data after the resolution characteristics are applied.

15. The apparatus according to claim 13, wherein the correction unit corrects the texture data by applying color reproducibility information corresponding to the output condition to the texture data and adding, to the texture data before the color reproducibility information is applied, a difference between the texture data before the color reproducibility information is applied and the texture data after the color reproducibility information is applied.

16. The apparatus according to claim 15, further comprising a unit configured to perform color gamut measurement for each output condition, and store the color reproducibility information corresponding to the output condition.

17. The apparatus according to claim 15, wherein the color reproducibility information is luminance reproducibility information.

18. The apparatus according to claim 13, further comprising an illumination data acquisition unit configured to acquire illumination data,
wherein the application unit further composites an illumination pattern based on the illumination data with the texture data corrected by the correction unit, and applies obtained data to the target region.

19. The apparatus according to claim 1, wherein the output condition includes a condition concerning: a print method; a model of a printing apparatus; a print medium to be used for printing; print quality; and/or a rendering resolution of the image.

20. The apparatus according to claim 13, wherein the output condition includes a condition concerning at least one of a print method, a model of a printing apparatus, a print medium to be used for printing, print quality, or a rendering resolution of the image.

21. The apparatus according to claim 1, wherein if a size of the target region is larger than a size of the texture data, the application unit tiles the texture data and applies the texture data to the target region.

22. The apparatus according to claim 13, wherein if a size of the target region is larger than a size of the texture data, the application unit tiles the texture data and applies the texture data to the target region.

23. An image processing method comprising:
setting a target region;
acquiring a plurality of texture data for applying a metal representation on an image;
acquiring an output condition when outputting the target region;
selecting texture data based on the output condition; and
applying, to the target region, the texture data selected in the selecting,
wherein in the selecting, texture data from the plurality of texture data are selected based on skewness of a histogram of luminance contrast data when the plurality of texture data are output.

24. A non-transitory computer-readable storage medium storing a program for causing a computer to execute an image processing method, the method comprising:
setting a target region;
acquiring a plurality of texture data for applying a metal representation on an image;
acquiring an output condition when outputting the target region;
selecting texture data based on the output condition; and
applying, to the target region, the texture data selected in the selecting,
wherein in the selecting, texture data from the plurality of texture data are selected based on skewness of a histogram of luminance contrast data when the plurality of texture data are output.

* * * * *